US007804496B2

(12) United States Patent
Kong

(10) Patent No.: US 7,804,496 B2
(45) Date of Patent: Sep. 28, 2010

(54) IMAGE DISPLAY APPARATUS AND DRIVING METHOD THEREOF

(75) Inventor: Nam-Yong Kong, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1126 days.

(21) Appl. No.: 11/476,620

(22) Filed: Jun. 29, 2006

(65) Prior Publication Data

US 2007/0097153 A1 May 3, 2007

(30) Foreign Application Priority Data

Nov. 2, 2005 (KR) ..................... 10-2005-0104594

(51) Int. Cl.
*G06F 3/038* (2006.01)
*G09G 5/00* (2006.01)

(52) U.S. Cl. ...................................... 345/204; 345/604

(58) Field of Classification Search ................. 345/204, 345/604, 600, 589, 591, 683
See application file for complete search history.

(56) References Cited

U.S. PATENT DOCUMENTS 5,625,379 A * 4/1997 Reinert et al. ............... 345/604
5,734,362 A * 3/1998 Eglit ........................... 345/89
5,784,050 A * 7/1998 Corry .......................... 345/604
5,808,630 A * 9/1998 Pannell ........................ 345/546
6,043,804 A * 3/2000 Greene ........................ 345/601
6,501,480 B1 * 12/2002 MacInnis et al. ............ 345/538
6,873,341 B1 3/2005 Adams et al.
2005/0259113 A1 * 11/2005 Endo et al. .................. 345/604

* cited by examiner

*Primary Examiner*—Ricardo L Osorio
(74) *Attorney, Agent, or Firm*—McKenna Long & Aldridge LLP

(57) ABSTRACT

An image display apparatus according to the present invention includes an image data processor detecting a first region from first image data input from an external source, adjusting a brightness of the first region and generating second image data; and a display device for displaying the first region on a screen based upon the second image data provided from the image data processor, the brightness of the first region being different from the brightness of the other areas on the screen.

14 Claims, 3 Drawing Sheets

IMAGE DISPLAY APPARATUS AND DRIVING METHOD THEREOF

This application claims the benefit of Korean Patent Application No. 2005-104594, filed on Nov. 2, 2005, which is hereby incorporated by reference for all purposes as if fully set forth herein.

BACKGROUND OF THE INVENTION

1. Field of the Invention

The present invention relates to a display device, and more particularly, to an image display apparatus and method for driving the same that can highlight a predetermined region on the screen by self-analyzing image data.

2. Background of the Invention

Recently, more attention is being drawn to display devices for displaying various data or images than ever. In the past, cathode ray tubes (CRTs) were mostly used as display devices. However, flat panel display devices such as liquid crystal display (LCD) devices, organic light emitting diode (OLED) display devices, and the like are rapidly replacing CRTs. Display devices generally display images sent from an external device such as a computer.

FIG. 1 is a block diagram illustrating an image display apparatus according to the related art.

Referring to FIG. 1, the image display apparatus includes a computer 10 for outputting image data DATA10[R,G,B], an image data controller and a display device 30 for displaying images based on the image data DATA10[R,G,B]. The computer also outputs coordinate data DATA[X,Y] to highlight a sub-screen region 35 within the display device 30. To do this, the image data controller 20 modulates the image data DATA 10[R,G,B] to adjust a brightness of the image data corresponding to the sub-screen region 35 and outputs a brightness-adjusted image data DATA20[R,G,B]. The brightness of the sub-screen region 35 may be higher than the brightness of the other areas on the screen of the display device 30. Hereinafter, this is referred to as a spotlight function.

In order to implement the spotlight function, it is necessary to provide the display device 30 with a coordinate information of the sub-screen region 35. A user may directly provide the display device 30 with such a coordinate information via the computer 10, or the image data controller 20 may be used to provide the display device 30 with such a coordinate information. In such a case, an interface Integrated Circuit (IC) 21 receives the coordinate data DATA[X,Y] from the computer 10 to transfer them to an image data adjusting IC 22. The image adjusting IC 22 then outputs the image data DATA20 [R,G,B] that is adjusted for the sub-screen region 35 and has an increased brightness.

As described above, the image display apparatus according to the related art needs a separate program installed in the computer 10 and a separate communication interface IC to provide the display device 30 with the coordinate data of the sub-screen region 35, thereby incurring an extra cost. In addition, performing the spotlight function increases the power consumption.

SUMMARY OF THE INVENTION

Accordingly, the present invention is directed to an image display apparatus and method for driving the same that substantially obviates one or more of the problems due to limitations and disadvantages of the related art.

An advantage of the present invention is to provide an image display apparatus and method for driving the same that can highlight a predetermined region on the screen by self-analyzing image data without using a separate IC.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an image display apparatus, for example, includes: an image data processor detecting a first region from first image data input from an external source, adjusting a brightness of the first region and generating second image data; and a display device for displaying the first region on a screen based upon the second image data provided from the image data processor, the brightness of the first region being different from the brightness of the other areas on the screen.

In another aspect of the present invention, a method for driving an image display apparatus includes: converting first image data in an RGB format input from an external source into image data in a YUV format; detecting a second region by analyzing the image data in the YUV format; detecting a first region from the second region; adjusting a brightness of the image data in the YUV format corresponding to the first region; converting the brightness-adjusted image data in the YUV format into second image data in the RGB format; and displaying an image according to the second image data in the RGB format.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
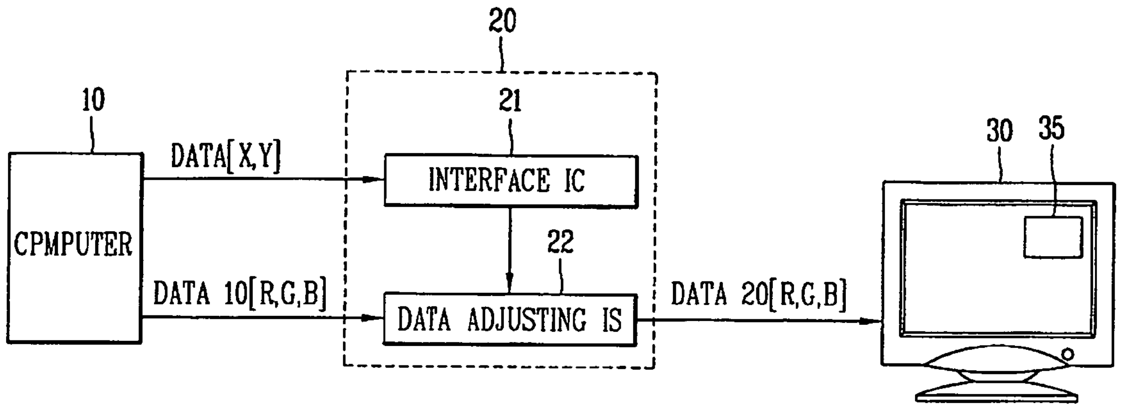
FIG. 1 BACKGROUND ART
FIG. 1 is a block diagram illustrating an image display apparatus according to the related art.
Figure 2:
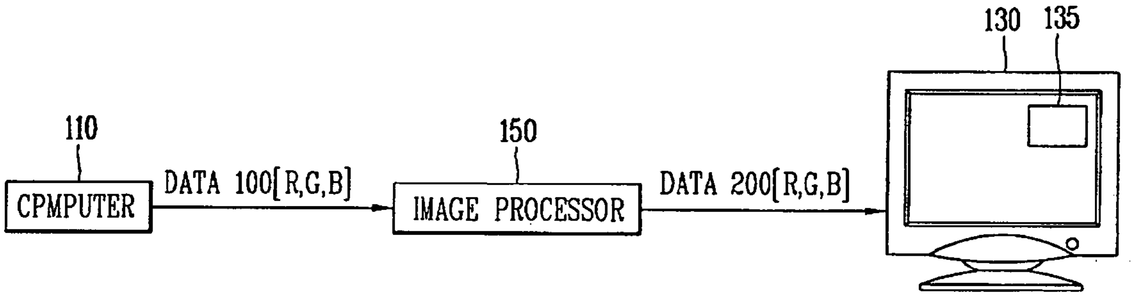
FIG. 2 is a block diagram illustrating an image display apparatus according to the present invention.

FIG. 2 is a block diagram illustrating an image display apparatus according to the present invention.

Referring to FIG. 2, the image display apparatus according to the present invention includes a computer 110 for outputting first image data DATA100[R,G,B], an image data processor 150 for detecting a sub-screen region 135 from the first image data DATA100[R,G,B] and outputting second image data DATA200[R,G,B] and a display device 130 for displaying images based on the second image data DATA200[R,G,B]. Because the second image data DATA200[R,G,B] includes image data of the sub-screen region 135 that has an increased brightness, the sub-screen region 135 is displayed with an increased brightness as compared to the other areas on the screen of the display device 130.

The computer 110 is an example of a video source that provides image data to the display device 130. Compared to the related art image display apparatus, the computer 110 does not provide a coordinate data of the sub-screen region 135.

The image data processor 150 analyzes the first image data DATA100[R,G,B] to self-detect the sub-screen region 135. The image data processor 120 also outputs the second image data DATA200[R,G,B] that includes the image data of the sub-screen region 135 with an increased brightness to highlight the sub-screen region 135. There are various methods for implementing the spotlight function. For example, the spotlight function may be accomplished by increasing only the brightness of the sub-screen region 135 or increasing the brightness of the sub-screen region 135 and lowering the brightness of the other areas on the screen. In this embodiment, the display device 130 performs the spotlight function using the second image data DATA200[R,G,B] received from the image data processor 150.

Due to recent technological developments, display devices may display more than one moving image on a single screen. For example, a moving image may be displayed on the sub-screen region 135, while a still image may be displayed on the main screen region of the display device 130. Although the display device 130 may include more than one sub-screen, it is assumed for convenience of explanation that the display device 130 in the embodiment includes a single sub-screen 135.

The image data processor 120 analyzes a brightness component of the first image data DATA100[R,G,B] to detect the sub-screen region 135 on which a moving image is displayed, and thereafter adjusts the brightness component of the first image data DATA100[R,G,B] in order to highlight the sub-screen region 135.

Figure 3:
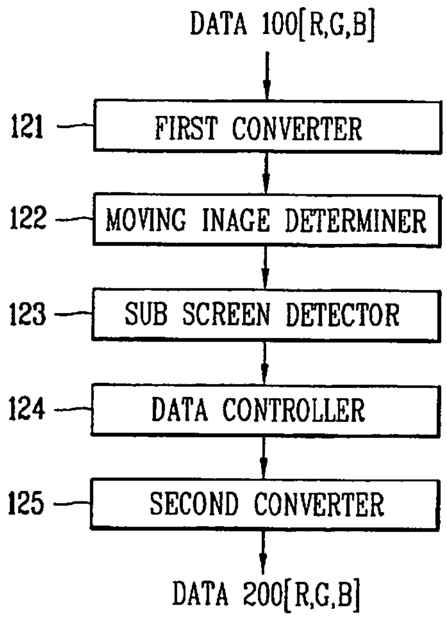
FIG. 3 is a block diagram illustrating a configuration of the image data processor in FIG. 2.

FIG. 3 is a block diagram illustrating a configuration of the image data processor 150.

Referring to FIG. 3, the image data processor 150 includes a first converter 121 for converting the first image data DATA 100[R,G,B] in an RGB format configured with gradation components of red (R), green (G) and blue (B) into image data in a YUV format configured with a brightness Y and color difference components U and V, a moving image determiner 122 for determining the existence and position of a moving image based upon changes in the brightness component Y, a sub-screen detector 123 for detecting the sub-screen region 135 from the moving image applied from the moving image determiner 122, a data controller 124 for adjusting the brightness component of the sub-screen region 135 applied from the sub-screen detector 123 in order to highlight the sub-screen region 135, and a second converter 125 for converting the image data in the YUV format that includes the brightness component Y adjusted in the data controller 124 back into the second image data DATA200[R,G,B] in the RGB format for an output.

The moving image determiner 122 determines whether a moving image is being provided based upon the brightness component Y of the image data in the YUV format. For moving images, a brightness of an image displayed on the same position changes every frame. Accordingly, whether a moving image is being provided can be determined by comparing the brightness components Y of the moving image data of, for example, two consecutive frames. Accordingly, the first converter 121 converts the first image data DATA[R,G,B] in the RGB format into the image data in the YUV format before sending the image data to the moving image determiner 122.

When the moving image determiner 122 compares the brightness components Y of the image data of two consecutive frames and determines the existence of a moving image at a certain position on a screen, the moving image determiner 122 then detects a window of the moving image.

After receiving the image data of the window of the moving image from the moving image determiner 122, the sub-screen detector 123 detects the edges of the moving image in the window and determines the sub-screen region 135 on which the moving image will be displayed based upon the detected edges. The sub-screen detector 123 uses an edge detection method to detect the sub-screen region 135. The size of the window is generally equal to or greater than the size of the sub-screen region 135.

The data controller 124 receives the image data of the sub-screen region 135 detected by the sub-screen detector 123. The data controller 124 increases a brightness component Y of the image data corresponding to the sub-screen region 135 to highlight the sub-screen region 135. In this embodiment, although the data controller 124 adjusts only the brightness component Y of the sub-screen region 135, it is also possible to adjust the entire brightness component Y of the main screen region of the display device 130 to implement a stronger highlighting effect. For example, the data controller 124 may increase the brightness component Y of the image data corresponding to the sub-screen region 135 and reduce the brightness component Y of the image data corresponding to the remaining areas of the main screen.

The moving image determiner 122, the sub screen detector 123 and the data controller 124 use the image data in the YUV format for the brightness adjustment. However, in order to actually display images through the display device 130, the image data in the YUV format should be converted back into the image data in the RGB format. The second converter 125 converts the image data in the YUV format of which brightness component Y is adjusted by the data controller 124 into the image data in the RGB format and outputs the second image data DATA200[R,G,B].

The display device 130 receives the second image data DATA200[R,G,B] and displays images in which the brightness of the images in the sub-screen region 135 is higher than the brightness of the images on the main screen of the display device 130.

The moving image detection method used in the moving image determiner 122 and the edge detection method used in the sub-screen detector 123 will now be explained in detail with reference to the attached drawings.

Figure 4A:
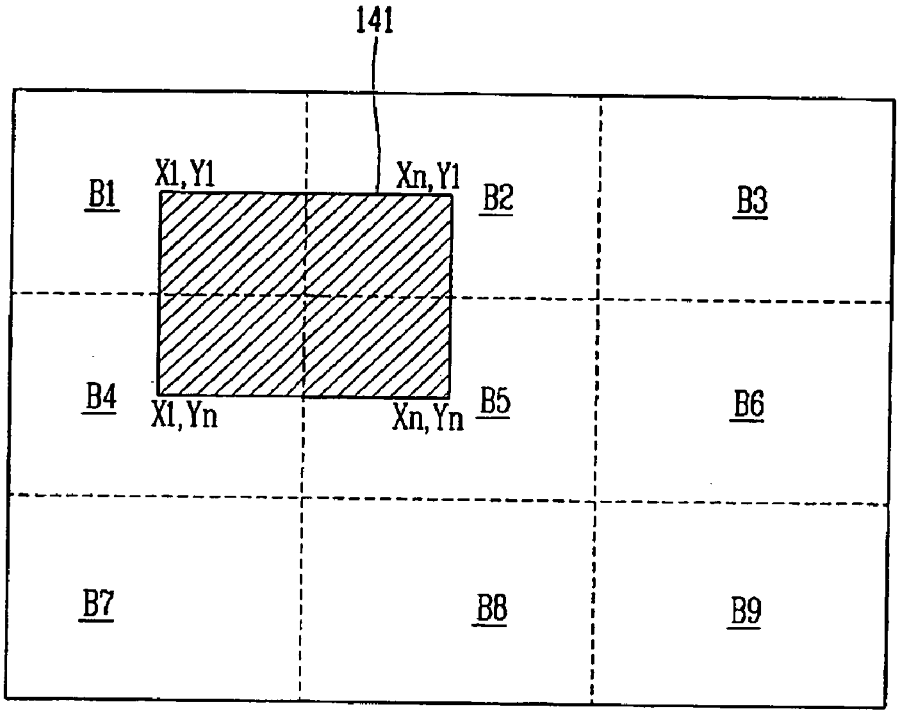
FIG. 4A is a schematic view illustrating a moving image detection method according to the present invention.
Figure 4B:
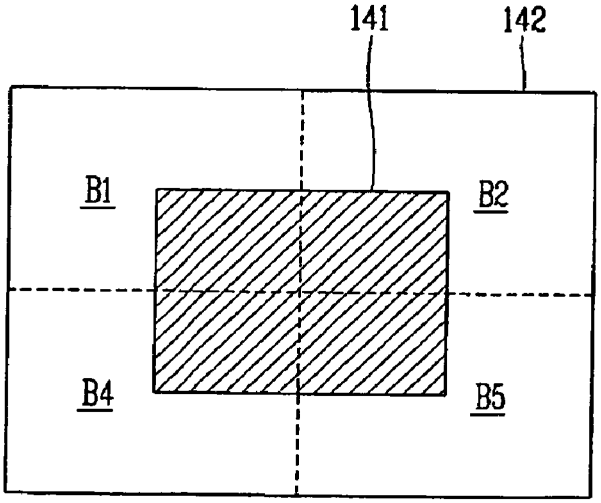
FIG. 4B is a schematic view illustrating a window detected by the moving image detection method illustrated in FIG. 4A.

FIG. 4A is a schematic view illustrating a moving image detection method by the moving image determiner 122 in FIG. 3, and FIG. 4B is a schematic view illustrating a window 142 detected by the moving image detection method.

Referring to FIGS. 4A and 4B, the moving image determiner 122 divides a screen into a plurality of blocks B1 to B9 to facilitate the detection of a moving image. The moving image determiner 122 analyzes the brightness components Y of the image data in the YUV format received from the first converter 121 and detects whether there exists a moving image in each of the blocks B1 to B9. That is, the moving image determiner 122 compares the brightness components Y of the image data of two consecutive frames displayed in each of the blocks B1 to B9 and detects the existence of a moving image and its position.

In FIG. 4A, a moving image region 141 (i.e., a sub-screen region) exists over the first block B1, the second block B2, the fourth block B4 and the fifth block B5. In this case, the total area of the first block B1, the second block B2, the fourth block B4 and the fifth block B5 becomes a window 142. When the screen is divided into more number of blocks, the size of the window 142 is closer to the size of the moving image region 141 on which the moving image is actually displayed.

The image data of the window 142 is transferred from the moving image determiner 122 to the sub-screen detector 123. The brightness of the images drastically changes at the edges of the moving image region. It is thus possible to determine a shape, size, position, etc, of a certain object by detecting the edges. In such a way, the sub-screen detector 123 detects the edges existing within the window 142 and the moving image region 141 on which the moving image is actually displayed.

More particularly, the sub-screen detector 123 initially detects an edge at a point (i.e., X1, Y1) of the first block B1 by executing the edge detection method from an upper end of the left side of the window 142. Thereafter, the edge detection method is continuously executed in a horizontal direction with respect to a unit region. An edge at a point (i.e., Xn, Y1) of the second block B2 is then detected by continuously executing the edge detection method. Thus, the two coordinate values (X1, Y1) and (Xn, Y1) of the moving image region 141 are obtained. A width W of the moving image region 141 is calculated based upon the number of the detected unit regions.

Afterwards, the edge detection is repeatedly performed, increasing the number of horizontal lines. Then, a height H of the moving image region 141 is calculated based upon the number of the horizontal lines. Upon repeatedly performing the edge detection method, a third coordinate value (X1, Yn) of the moving image region 141 in the fourth block B4 is obtained. Thereafter, a fourth coordinate value (Xn, Yn) of the moving image region 141 in the fifth block B5 can be obtained. Accordingly, the moving image region 141 detected through such a process matches the sub-screen region 135.

The edge detection method used by the sub-screen detector 123 may include a homogeneity operator, difference operation, differentiation, or the like. This embodiment of the present invention uses the differentiation, which will be explained with reference to FIG. 5.

Figure 5A:
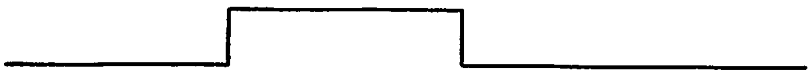
FIGS. 5A-5E are brightness signals used in an edge detection method and a sharpness compensation method according to the present invention.
Figure 5B:
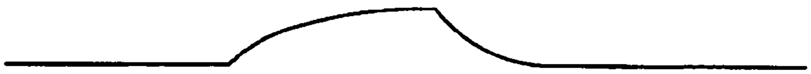
Figure 5C:

As described above, brightness changes drastically at edges of the moving image region 141 within the window 142. FIG. 5A is an exemplary signal showing the changes in brightness of the edge of the moving image region 141, and FIG. 5B is a signal obtained by integrating the signal of FIG. 5A. The signal of 5C is obtained by performing a first derivation on the signal of FIG. 5B. Upon differentiating the signal of FIG. 5C, the signal of FIG. 5D is obtained.

Figure 5D:
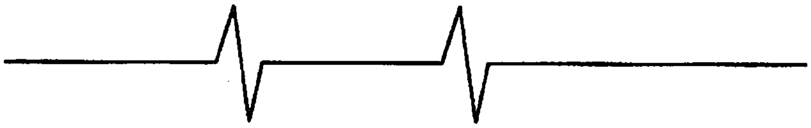

The sub-screen detector 123 performs the edge detection method based upon the secondly-differentiated signal of FIG. 5D, and then determines the sub-screen region 135 through the process illustrated in FIG. 4.

The data controller 124 performs the spotlight function for the sub-screen region 135 and also performs a sharpness compensation function in order to make an outline of an image displayed within the sub-screen region 135 more vivid. The sharpness compensation function will now be explained in detail with reference to FIG. 5.

Figure 5E:
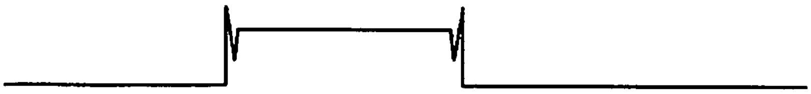

The brightness signal such as the signal of FIG. 5A is added to the secondly-differentiated signal of FIG. 5B to thereby obtain a brightness signal having a compensated outline such as a signal of FIG. 5E. The signal of FIG. 5E is used as a type of mask for the sharpness compensation function for the original image that makes the outline of the image displayed within the sub-screen region 135 more vivid than the outline of the original image.

As described above, because the image processor according to the present invention performs the spotlight function by self-detecting the sub-screen region from the image data, a separate device for receiving the coordinate data for the sub-screen region from the exterior is not required, thereby reducing the fabrication cost. In addition, the data controller within the image processor performs the sharpness compensation function for the image displayed within the sub-screen region to display a better image.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An image display apparatus comprising:

an image data processor detecting a first region from first image data input from an external source, adjusting a brightness of the first region and generating second image data; and a display device for displaying the second region on a screen based upon the second image data provided from the image data processor, the brightness of the first region being different from the brightness of the other areas on the screen, wherein the image data processor includes:

a first converter that converts the first image data in the RGB format into image data in a YUV format;

a moving image determiner that detects a second region by analyzing the brightness of the image data in the YUV format;

a sub-screen detector that detects the first region by detecting edges of the first region within the second region;

a data controller that adjusts the brightness of the image data in the YUV format corresponding to the first region; and a second converter that converts the image data in the YUV format of which brightness is adjusted into the second image data in the RGB format and outputting the second image data.

2. The apparatus of claim 1, wherein the first region displays a moving image.

3. The apparatus of claim 1, wherein the moving image determiner divides the screen into a plurality of blocks to analyze the brightness of each block.

4. The apparatus of claim 1, wherein the second region is equal to the first region or greater than the first region.

5. The apparatus of claim 1, wherein the data controller increases the brightness of the image data in the YUV format corresponding to the first region.

6. The apparatus of claim 1, wherein the data controller increases the brightness of the image data in the YUV format corresponding to the first region, and decreases the brightness of the image data in the YUV format corresponding to the other areas on the screen.

7. The apparatus of claim 1, wherein the sub-screen detector performs a second derivation on a brightness signal of the second region, and detects edges of the first region.

8. The apparatus of claim 1, wherein the data controller performs a sharpness compensation function for an image within the first region.

9. A method for driving an image display apparatus comprising:

converting first image data in an RGB format input from an external source into image data in a YUV format;

detecting a second region by analyzing the image data in the YUV format;

detecting a first region from the second region;

adjusting a brightness of the image data in the YUV format corresponding to the first region;

converting the brightness-adjusted image data in the YUV format into second image data in the RGB format; and displaying an image according to the second image data in the RGB format.

10. The method of claim 9, wherein the first region displays a moving image.

11. The method of claim 9, further comprising:

when adjusting the image data in the YUV format corresponding to the first region, adjusting a brightness the image data in the YUV format corresponding to the second region.

12. The method of claim 9, wherein the second region is detected by dividing a main screen into a plurality of blocks.

13. The method of claim 12, wherein the second region is a sum of the blocks that includee any portion of the first region.

14. The method of claim 9, wherein the first region is detected by detecting edges of the first region within the second region.

* * * * *